US007039942B2

(12) United States Patent
Dan et al.

(10) Patent No.: US 7,039,942 B2
(45) Date of Patent: May 2, 2006

(54) PAD ADJUSTABLE EQUALIZER FOR TWO WAY CABLE TRANSMISSION

(75) Inventors: Viorel Dan, Toronto (CA); Anthony J. Sandaluk, Toronto (CA)

(73) Assignee: Cableserv Electronics, Ltd., Ontario (CA)

( * ) Notice: Subject to any disclaimer, the term of this patent is extended or adjusted under 35 U.S.C. 154(b) by 737 days.

(21) Appl. No.: 09/922,881

(22) Filed: Aug. 6, 2001

(65) Prior Publication Data

US 2005/0246755 A1  Nov. 3, 2005

Related U.S. Application Data

(63) Continuation-in-part of application No. 09/426,624, filed on Oct. 26, 1999, now Pat. No. 6,785,907, which is a continuation-in-part of application No. 09/134,514, filed on Aug. 14, 1998, now Pat. No. 5,990,929.

(51) Int. Cl.
*H04N 7/173* (2006.01)
(52) U.S. Cl. .................. 725/127; 725/119; 725/126; 330/304; 333/28 R; 333/18; 333/81 R; 333/81 A; 333/81 B; 455/311; 375/229
(58) Field of Classification Search ............... 725/119, 725/120, 125, 126–128; 348/707, 914; 330/304; 375/229–236; 333/28 R, 28 T, 18, 81 R, 333/81 A, 81 B; 455/311
See application file for complete search history.

(56) References Cited

U.S. PATENT DOCUMENTS

| | | | | | |
|---|---|---|---|---|---|
| 3,568,101 | A | * | 3/1971 | Feistel | 333/28 R |
| 4,677,390 | A | * | 6/1987 | Wagner | 330/149 |
| 4,755,776 | A | * | 7/1988 | Preschutti | 333/100 |
| 4,812,779 | A | * | 3/1989 | Wagner | 330/149 |
| 4,835,494 | A | * | 5/1989 | Preschutti | 333/16 |
| 4,947,386 | A | * | 8/1990 | Preschutti | 370/283 |
| 4,963,966 | A | * | 10/1990 | Harney et al. | 725/149 |
| 4,970,722 | A | * | 11/1990 | Preschutti | 370/407 |
| 5,193,213 | A | * | 3/1993 | Chon | 455/45 |
| 5,194,947 | A | * | 3/1993 | Lowcock et al. | 725/149 |

(Continued)

*Primary Examiner*—Vivek Srivastava
*Assistant Examiner*—Jason Salce
(74) *Attorney, Agent, or Firm*—Ohlandt, Greeley, Ruggiero&Perle L.L.P.

(57) ABSTRACT

A forward signal equalizer for a forward amplifier for two-way coaxial cable systems, of the type having a distribution center distributing forward signals, and having reception facilities for receiving return signals from said cable system, the system having forward amplifiers for receiving forward signals, and having return amplifiers, and the forward signal equalizers are settable to provide varying amplifier specifications, and having receptacles for receiving plug-in equalizer components for varying the specifications of the forward amplifier, the equalizer components having a range of varying performance characteristics so that a component can be selected and plugged in to the forward signal equalizer to produce the performance specifications desired at a predetermined location in the cable system.

9 Claims, 6 Drawing Sheets

U.S. PATENT DOCUMENTS

| | | | |
|---|---|---|---|
| 5,421,030 A * | 5/1995 | Baran | 725/106 |
| 5,738,525 A * | 4/1998 | Davies | 434/219 |
| 5,742,205 A * | 4/1998 | Cowen et al. | 330/269 |
| 5,835,844 A * | 11/1998 | Stoneback et al. | 725/125 |
| 5,990,929 A * | 11/1999 | Sandaluk | 725/127 |
| 5,999,059 A * | 12/1999 | Blount et al. | 330/289 |
| 6,047,159 A * | 4/2000 | Powell et al. | 725/105 |
| 6,091,932 A * | 7/2000 | Langlais | 725/111 |
| 6,310,957 B1 * | 10/2001 | Heller et al. | 380/236 |
| 6,321,384 B1 * | 11/2001 | Eldering | 725/125 |
| 6,345,390 B1 * | 2/2002 | Eto et al. | 725/127 |
| 6,530,088 B1 * | 3/2003 | Brickell et al. | 725/127 |
| 6,549,087 B1 * | 4/2003 | Hoang et al. | 333/15 |
| 6,598,232 B1 * | 7/2003 | McAlear | 725/126 |
| 6,600,900 B1 * | 7/2003 | Palinkas | 455/3.05 |

\* cited by examiner

PAD ADJUSTABLE EQUALIZER FOR TWO WAY CABLE TRANSMISSION

This application is a Continuation-In-Part of U.S. patent application Ser. No. 09/426,624, now U.S. Pat. 6,785,907 filed on Oct. 26, 1999, entitled "Amplifier and Equalizer for Two-way Cable Transmission and Method," by Anthony J. Sandaluk and Viorel Dan, which is a Continuation-In-Part of U.S. patent application Ser. No. 09/134,514, filed on Aug. 14, 1998, entitled "Return Amplifier For Two Way Cable Transmission and Method," by Anthony J. Sandaluk, now issued as U.S. Pat. No. 5,990,929.

FIELD OF THE INVENTION

The invention relates to equalizers for use on a coaxial cable transmission system, for equalizing the signal strengths of the forward signals and also of the return signals carried on such system, and to such an equalizer having plug in attenuator components for presetting the performance characteristics of the equalizer to a particular location on the cable system and for a predetermined frequency band.

BACKGROUND OF THE INVENTION

Coaxial cable transmission networks for distributing cable television services are in wide use in many cities and towns, and provide excellent services for distributing television signals to television sets of subscribers on the network. Such cable television distribution systems are based on a coaxial wire cable, having a single central conductive core, and a woven sheath of wire or other form of conductive sheath, insulated from the core. Such coaxial cable is capable of transmitting great volumes of information at high speed, and with very little interference. In the past such cable systems have been used for one way transmission of television signals from the head end signal source to the consumers television sets. Forward amplifiers are provided at intervals to maintain signal strength, which would otherwise become attenuated, due to the length of the cable system. Such forward amplifiers usually incorporated signal strength equalizers and attenuators for equalizing the signal strengths across the frequency band of the signals. In other cases equalizers were provided separate from the forward amplifiers The existence of wide spread cable television signal networks has lead to the development of their use as a means of connecting consumers to the Internet system. The coaxial cable systems, with forward signal amplifiers and equalizers located along the cables at spaced intervals, and with their substantial freedom from interference, lend themselves particularly well to the rapid transmission of high volume signals such as are generated by the Internet system. Consequently consumers are increasingly looking to the coaxial cable television networks as a means of connecting their computers to the Internet, so as to avoid the difficulties of connections via the telephone wire systems.

One of the problems encountered in using coaxial cable networks for distribution of Internet signals is that Internet signals travel in two directions, both to and from the consumer. This is unlike television signals, which travel in the forward direction, from the supplier to the consumer. To carry Internet signals, the coaxial cables are required to carry signals in both directions simultaneously. The consumer will be receiving signals from an Internet service provider (ISP), and will be generating return signals, generated from his or her computer, back onto to the Internet. In theory the coaxial cable networks are ideally suited to this type of two-way transmission. In practice however, there are problems which arise from the original design of such cable systems. Since the coaxial cable networks are relatively long, the forward signals on the networks gradually become attenuated and decrease in strength as they pass along the length of the cable. It is well known that signal attenuation is greatest in the high frequency end of the bandwidth and progressively decrease down to the low end of frequency. The end result is a signal which is unbalanced, and the condition is know as "signal slope" or "slope loss". In the case of television forward signals this problem is overcome, as mentioned above, by the use of forward signal equalizers located in the coaxial cables at spaced intervals. These forward signal equalizers together with the usual forward signal amplifiers, ensure that all subscribers on any particular cable network will receive fully balanced equalized signals of adequate strength so that in spite of the considerable length of any one particular cable, and the number of consumers tapping in to the cable, the forward signals will all be substantially of the same balanced signals of adequate signal strength to all households on that cable network.

Such forward signal amplifiers and equalizers are capable only of amplifying the forward signals fed into the coaxial cable from the head end and equalizing them across the forward signal frequency band but cannot amplify or equalize return signals, passing in the opposite direction.

When it is attempted to adapt the coaxial cable system for two-way transmission of Internet signals, the return Internet signals are unable to pass through the forward amplifiers and equalizers already incorporated in the coaxial network. Return signal amplifiers have been used to amplify the return Internet signals. These return signal amplifiers are located alongside the forward amplifiers on the coaxial cable network and pass the return Internet signals around the forward amplifiers, and increase the return Internet signal strength. In this way, the return signals bypass the forward amplifiers, and at the same time their signal strength is maintained at the desired level so that it can be fed back to the Internet server. Other communication may require the sending of reverse signals along the cable, such signals including eg. metering box and telephone signals.

The problem of signal strength is aggravated by the attenuation of signal strength. As mentioned above attenuation varies across the band width, and is greater in the higher range of frequencies, and is lower in the lower range of frequencies. The forward equalizers in use on cable systems are already designed to overcome these problems, and equalize the signal strength over the entire frequency band of the forward television signals. However, the adaptation of an existing cable network to accept two-way transmission of signals such as Internet signals, requires both that the return amplifiers, and also suitable equalizers, be installed on the already existing cable network, and further that the existing forward amplifiers with equalizers shall be modified so as to equalize all signals, both television and Internet, travelling in the forward direction. Alternatively where the existing equalizers can be removed they can be replaced by stand alone equalizers.

Forward equalizers for maintaining level signal strength of the forward signals should be capable of equalizing both the Internet and television signals over the entire frequency range of the signals and to equalize these signals back to a uniform level of signal strength, across the entire range of frequency of both Internet and television signals. However, the signal strength of the signals at any given location on an existing cable network can only be determined by actually measuring the signals at that location. For example when the cable system is modified or new users are added, this signal strength will vary from one location to another. At present, the forward amplifiers and equalizers are produced as standard items, with preset performance. Due to the varying needs at different locations in the system, however, a variety of different forward amplifiers and equalizers are required, which have performance characteristics which vary so as to suit signal strengths from one cable location to another.

Typically, the Internet forward signals are placed within this frequency range of from about 50 to 860 megahertz, ie the usual bandwidth of television signals. Certain other forward signals may also be included in the range. As signal losses occur due to cable attenuation the signals will be unbalanced, by slope losses.

The design and construction of forward signal amplifiers and equalizers for cable systems is dependent upon the fact that the forward amplifiers and equalizers are positioned at spaced locations along any given length of coaxial cable in the system and are located at an elevation upon a cable post, in most cases. Equalizers with standard characteristics will not be equally suitable at each location. In fact, it will be found that before an amplifier or equalizer is installed by the installer, the signal strength at that location in the cable must be tested and an equalizer must be installed having the correct equalizing characteristics for that particular location in the coaxial cable network. These specifications will vary from one location to another along any given length of the coaxial cable.

In normal practice amplifier manufacturers produce a whole range of equalizers having a range of different equalization characteristics. A coaxial line crew carries a large supply of such equipment with them. After testing and checking the signal strength and slope at a particular location, could then select and insert the appropriate amplifier and equalizer having the correct specifications for that location. This method requires a very large investment for supplying an adequate inventory covering a full range of signal characteristics, to each particular line crew. In addition, stocking and transporting such a large inventory covering a wide range of different characteristics, presents a problem of logistics involving a large number of objects with different markings and different characteristics.

A further problem is the fact that the line crew person will be required to climb up the post to reach the coaxial cable. Then the line person must check the signal strength and then come down and select the appropriate equalizer and then climb back up again and insert it. This is a slow and tiresome job.

For all of these reasons, providing an adequate number of equalizers having ranges of different characteristics to meet all conditions and requirements on a given coaxial cable network becomes a logistical nightmare, and a severe financial strain, and causes much undesirable additional labour.

The cable networks carrying television signals are already in existence and the forward amplifiers and equalizers are already in place on posts on those cables. However, as conditions change and as the cable network changes, changes in amplification and equalization may be required.

Adapting the entire cable network by replacing all of the forward equalizers with new equalizers having modified characteristics for equalization, is simply not practical. It also poses the same logistic problem described above.

SUMMARY OF THE INVENTION

For all of these reasons, therefore, it is desirable to provide a standardized equalizer circuit and having a plurality of plug-in resistive components, which can simply be carried in the personal equipment of the lines person. These standardized equalizer circuits may then simply be inserted in the existing forward amplifiers by removing the existing equalizer circuits in the existing forward amplifiers, and installing the new standardized equalizer circuits. Alternatively if stand alone equalizers are already installed on the cable system then they can simply be removed and replaced. By the use of the plurality of plug-in components, each equalizer circuit after it is installed, can then be adjusted to the appropriate equalizer characteristics required for that particular location along the cable network.

Thus, after climbing up to the cable, the lines person can simply install a standardized equalizer, in place of the existing equalizer and then test the signal strength and characteristics and then insert the appropriate plug-in resistive components to produce an equalizer having the necessary characteristics for that particular location in the system.

A lines person will be required to carry only one set of plug in components, in an adequate range of performance characteristics, so that when the signal strength has been measured at that location, the equalizer can readily be set to the correct performance, by simply selecting the plug in components having the correct values.

This greatly reduces the requirement for carrying a large inventory of and greatly reduces the financial burden of carrying such an inventory and also reduces the logistical problems and the time consuming effort by the lines crew of checking signal strength.

With a view to achieving improvements in equalizers for coaxial cable lines, of the type having a transmission centre, and a plurality of coaxial cable lines extending therefrom, and a plurality of tap ports connecting signals from the coaxial cable line to respective terminals, and said coaxial cable system having a signal distribution system having facilities for distributing signals onto said cable system and wherein signals passing along said cable system are progressively attenuated in signal strength, said system having amplifiers at spaced intervals there along, for receiving forward signals passing along said coaxial cables, and amplifying the same, the invention provides a standardized signal equalizer circuit for installation in the cable system having a standard equalization circuit, which is settable to provide varying equalization specifications, and having receptacles for receiving plug in circuit components for varying said equalization specifications, and a plurality of plug in circuit components, each being adapted to interfit with said standardized equalizer circuit, and said components having a range of varying performance characteristics whereby a respective said component can be selected and plugged in to a said equalizer circuit to produce the performance specifications desired at a predetermined location.

The invention further contemplates the provision of return signal equalizers and wherein the forward signal equalizer and the return equalizer shall incorporate a circuit adapted to receive one of a group of plug in attenuator components, wherein the plug in attenuator components for the forward equalizer circuit, and for the return equalizer shall be interchangeable between the two circuits.

In this way, a lines person can, at one time, both install a return amplifier, and a forward equalizer, and can set both forward and return equalizers to the characteristics required for that location.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DESCRIPTION OF A SPECIFIC EMBODIMENT

Figures 1, 1A:
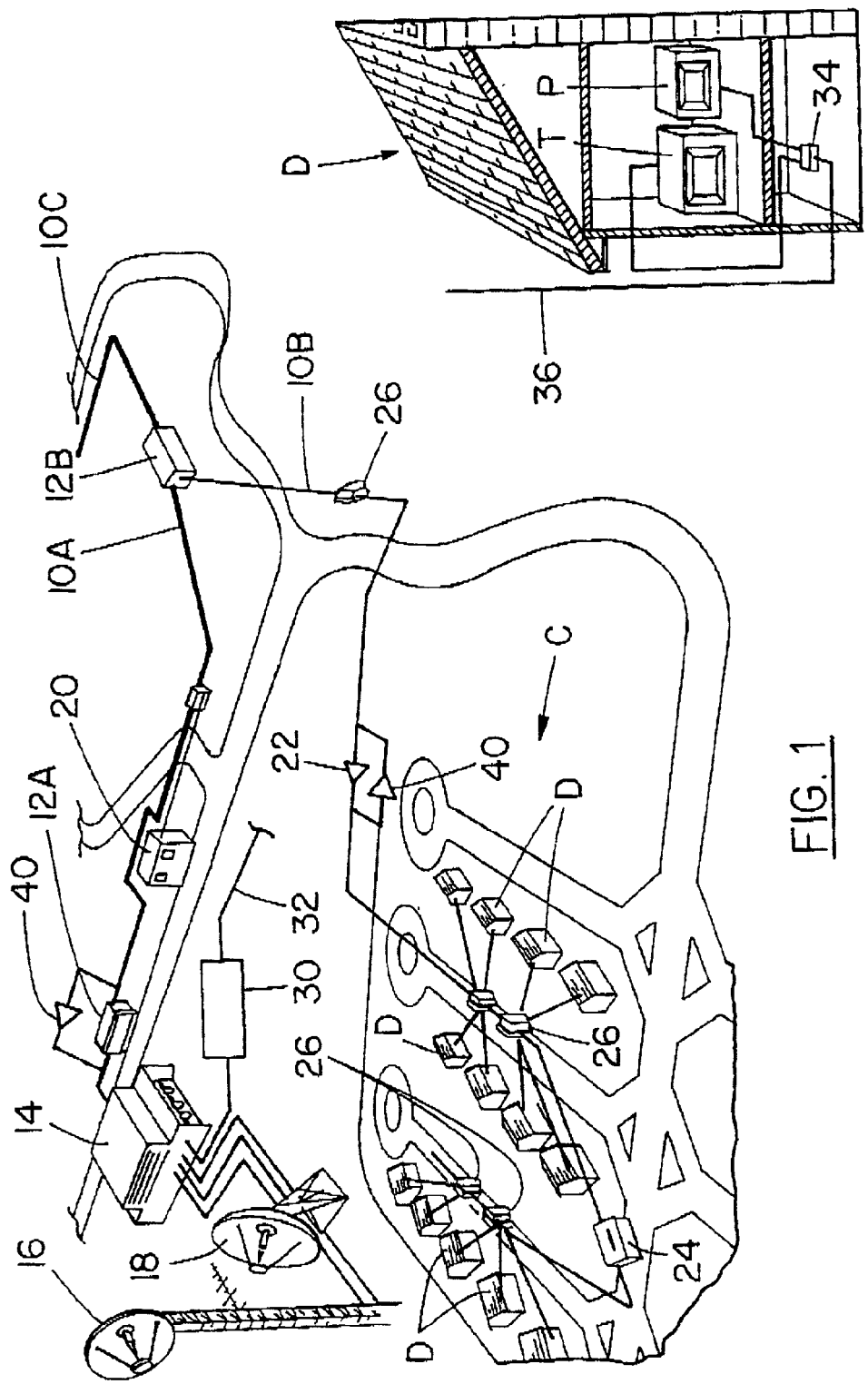
FIG. 1 is a schematic perspective illustration of a portion of a community coaxial cable signal distribution system.
FIG. 1A shows a portion of one dwelling greatly enlarged and cut away for the purposes of explanation and clarity.

Referring first of all to FIG. 1, it will be seen that what is represented there is a community indicated generally as C, consisting of a plurality of dwellings indicated as D, and one of the dwellings indicated as D being greatly enlarged and partially cut away.

Within the cut away enlarged dwelling D it will be seen that the dwelling is provided with a television receiver indicated as T, and a typical personal computer indicated as P.

It will of course be appreciated that the dwellings, television and personal computer do not form any part of the invention, and are merely represented schematically for the sake of explaining the utility of the invention.

A coaxial cable distribution line is indicated generally as 10A. It is supplied through a main station 12A, from a head end supply installation 14 with first forward signals, in this case television signals. Further main stations 12B and so on may be located at spaced intervals along the cable 10A, allowing branch cables indicated for example as 10B and 10C to be connected to the main cable 10A.

The head end installation 14 in this particular case is shown supplied with VHF signals through a VHF microwave antenna 16. A television satellite antenna 18 may also be connected to the head end 14. Typically the microwave antenna 16 will be arranged and focussed on a microwave transmitter at a distance across country, and will receive focussed television signals from the microwave transmitter station (not shown) the details of such systems being well-known by persons skilled in the art.

The satellite antenna 18 will similarly be focussed a television transmission satellite, such as is well-known in the art, located in fixed orbit above the earth, so that television signals may be received at the satellite antenna 18 from such a satellite (not shown). All of such signals may be processed in the head end installation 14, and distributed along the cable system 10A, 10B, 10C and so on throughout the community.

In accordance with well-known practice, the cable system 10A, 10B and 10C is provided with a power supply indicated generally as 20, to supply power to the cable system.

At various locations along the cable system there will be located forward amplifiers indicated generally as 22. The forward amplifiers 22 both amplify the forward signal and equalize the signal across the frequency band width, in such a manner as to amplify and equalize the levels of the various frequencies, so that all of the consumers indicated by the dwellings D will receive the signals of adequate signal strength and which signals are substantially equalized across the bandwidth of the forward signal. Optionally one or more line extenders 24 may be included which essentially provide the same function as the forward amplifiers 22.

In the example described above it is assumed that the forward amplifiers incorporate their own equalizers, and this has been the usual practice for some time. The actual amplifier circuit and equalizer circuit are shown in more detail in FIG. 3.

In this way, the level of the forward signal over the entire network of coaxial cables 10A, 10B, 10C and so on is substantially equalized to a stable level, across the entire frequency band being distributed, so as to ensure that every subscriber receives a satisfactory adequate signal.

Up to this point, what has been described is essentially a standard state of the art cable television distribution network, in which television forward signals are simply received and processed at a head end 14 and are distributed as forward signals down the coaxial cable system to the various subscribers indicated in this case as D.

It will of course be appreciated that the subscribers are not necessarily represented as dwellings, but may be any number of different types of outlets or institutions that may be connected by cable.

At various locations along the cable system there are located subscriber cable connections known as tap ports indicated generally as 26. There may be one tap port for each subscriber or there may be a plurality of subscribers connected to a single tap port, depending upon the design of the system, all of which is well-known in the art.

In addition however to distributing television signals, the cable system as illustrated is also used for distributing two-way signals. The two-way signals consist in this case of second forward signals supplied from an Internet server indicated generally as 30, and return signals generated by individual subscribers. The Internet server 30 is connected by any suitable Internet connecting line indicated as 32.

As explained above, the coaxial cable system is capable of carrying other non-television Internet signals which are at frequencies separated from the frequency ranges of various television channels, and the coaxial cable system is also capable of carrying return Internet signals, which will consist of signals developed by individual Internet subscribers in their own personal computers. The Internet system connected to individual subscribers having personal computers is itself well-known, and as mentioned above, is usually connected through telephone cable systems to individual dwellings or subscribers at various locations or in businesses. Other signals may be sent in the same manner. It will be understood that the signals generated by the consumers on their computers, or by others on their equipment, are digital signals. In accordance with present day practice each consumer is supplied with a digital to analogue converter (a modem). Usually this is supplied by the cable company. This converter converts the computer digital signals to analogue signals for transmission along the cable.

Also as mentioned above, the use of the coaxial cable television network as a means for handling both forward and return Internet signals has numerous advantages as compared with using the telephone wire distribution system.

Once the Internet servers signals are connected to the head end installation 14, they are distributed as second forward signals down the coaxial cable system 10A, 10B and 10C, and can be received by subscribers having appropriate equipment. Thus in the cut away dwelling D, a signal splitter 34 is shown receiving signals from the coaxial cable system, and distributing them to the television T on the one hand and to the personal computer P on the other hand.

The splitter 34 will operate so as to separate the television frequency signals on the coaxial cable system, from the Internet signals on the coaxial cable system. Each dwelling is connected from a tap port 26, by means of a connector cable 36.

It will of course be understood that not all of the dwellings D will be provided with a splitter 34, since not all of the dwellings D will in fact be customers of the Internet server 30.

In the case of those dwellings D which are not customers of the Internet server 30, then the cable connector 36 will forward the television signals directly into the television set. Alternatively, it may forward the signals through a conventional television cable splitter (not shown) into two or more television sets in the same dwelling in a well known manner.

As has already been explained, the Internet system involves the use of two-way signals, so that the Internet server will forward Internet signals onto the cable system, to the various subscribers at their personal computers P. The personal computers P will in turn operate to send return signals back up the cable system to the Internet server.

In order to ensure that these return Internet signals on the coaxial system bypass the forward amplifiers and are maintained at an appropriate signal strength, return amplifiers indicated generally as 40 are provided at various locations, corresponding to the locations of the forward amplifiers 20 along the cable system.

The return amplifiers 40 also incorporate, in this embodiment of the invention equalizers in a manner described below (see FIG. 3). The effect of these return amplifiers 40 and equalizer is to accept the return signals generated at the various personal computers P of the individual subscribers, and to both amplify them and to equalize them to ensure that the signal strength of the return signals at the frequencies across the Internet bandwidth are maintained at appropriate signal strength levels, so that when they reach the Internet server 30 and go back onto the Internet via the cable 32, the return signals are at a level adequate to carry appropriate information back onto the Internet.

As already explained above, one of the problems in the design of such amplifiers and equalizers is to ensure that they are effective both to amplify the various different frequency signals up to a signal level and to equalize those signals so that their signal strength is equalized and balanced across the signal frequency band. As mentioned, in the case of the return amplifier, typically the return signal frequency band is as wide as from 5 to 42 mhz, so that the attenuation of signals, and resulting slope losses, across the frequency band can be a serious problem.

Figure 2:
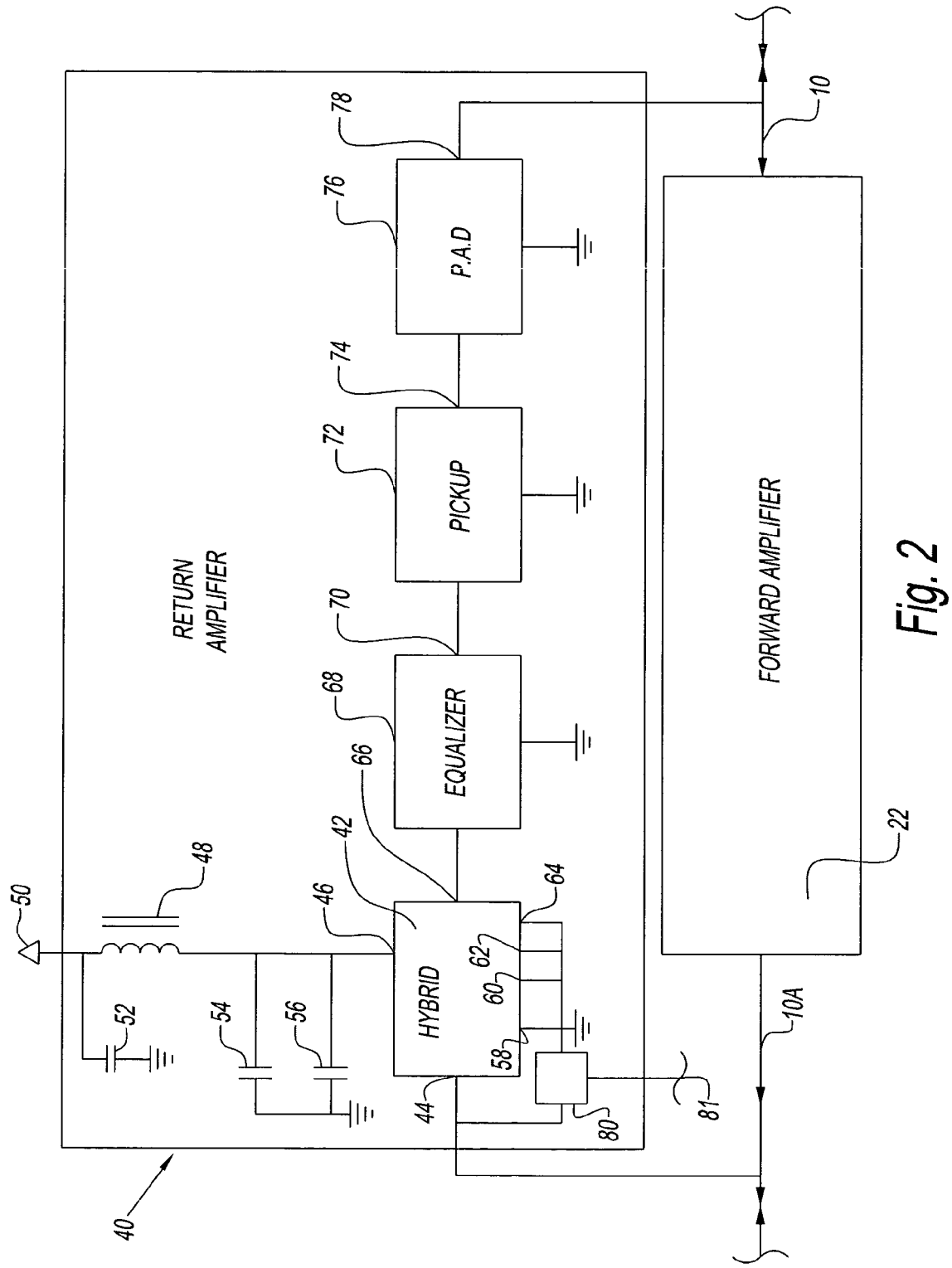
FIG. 2 is a block circuit diagram of a return amplifier illustrating the principles of the invention.
Figure 3:
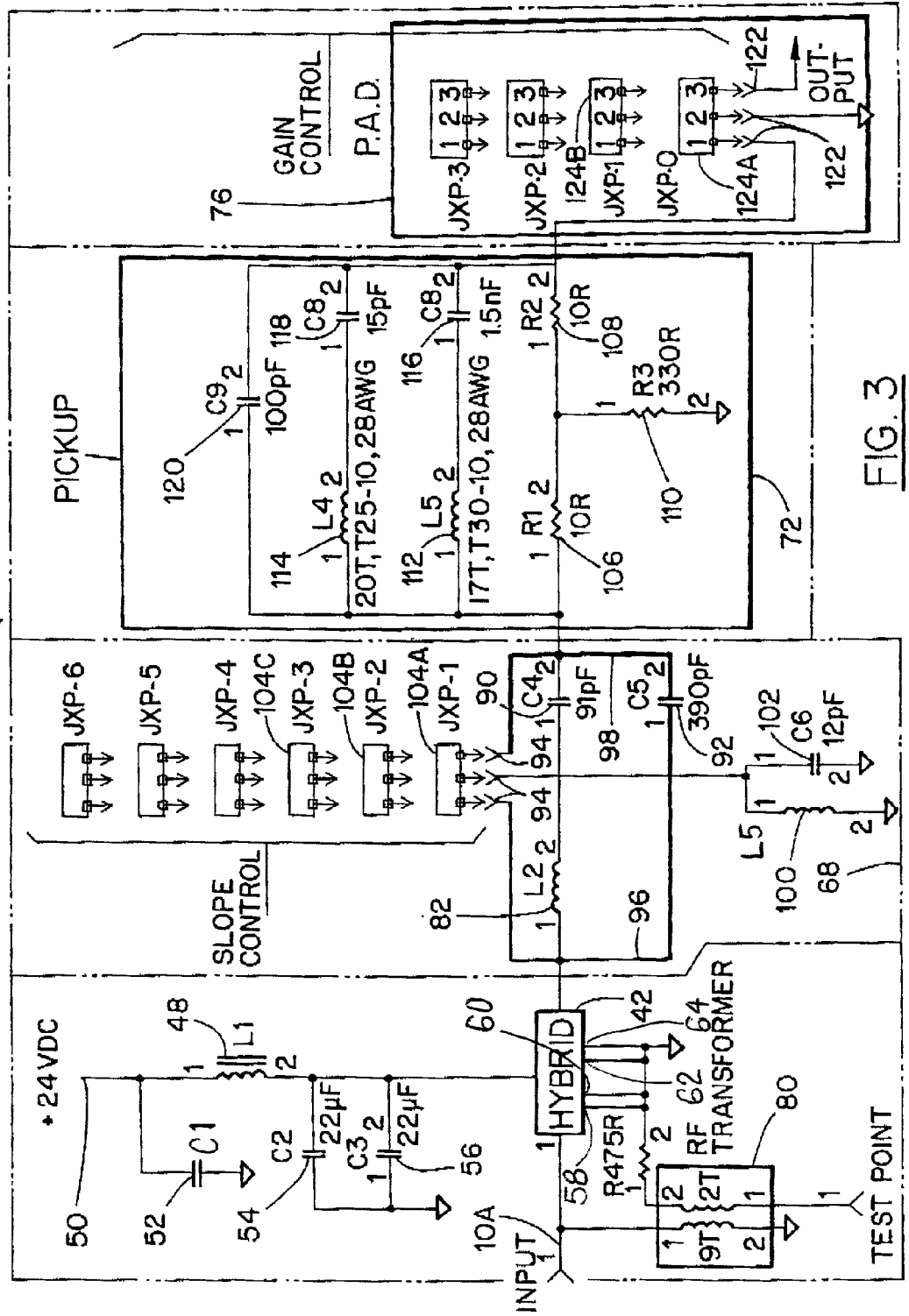
FIG. 3 is a detailed block circuit diagram of a return amplifier further illustrating the principles of the invention.

This amplification and equalization of the return signal frequencies is achieved in the manner shown in FIGS. 2 and 3.

Referring now to FIG. 2, the return amplifier 40, which it will be noted is connected to cable 10 on the input and output ends of the forward amplifier 22, comprises a gain block amplifier processor chip 42, having nine terminals. Terminal 44 is connected to the cable 10A downstream of forward amplifier 22, so as to receive return signals flowing back along cable 10A from, for example, a personal computer P or other signal source, capable of sending return signals along the coaxial cable system 10. Terminal 46 is connected via a choke 48 to a power source 50. Capacitors 52, 54 and 56 are connected between the power source 50 and the gain block amplifier chip 42.

Terminals 58, 60, 62 and 64 of gain block amplifier chip 42 are connected to ground. Terminal 66 is connected, so as to pass signals from chip 42 to equalizer 68. Equalizer circuit 68 is in turn connected at connection 70 to Pick up circuit 72. Pick up 72 is in turn connected at connection 74 to plug in attenuator circuit 76. Plug in attenuator circuit 76 is in turn connected via connector 78 back to the cable 10, upstream of the forward amplifier 22. In addition, the test point transformer 80 is connected between connections 58, 60, 62 and 64, and the input 1A. In this way return signals passing back up the cable system are amplified and equalized.

Referring now to FIG. 3 the return amplifier 40 and equalizer 68 are shown in more detail.

As already explained, the return amplifier at the return amplifier's input end (left-handed end of FIG. 3), comprises a gain block amplifier 42. The gain block amplifier 42 has nine terminals, and is connected to a power supply 50, through choke 48, and capacitors 52, 54, and 56. A test point transformer 80 connected to a test point 81 is also connected between the main input line 10A and the four lower terminals 58, 60, 62, and 64 of the gain block amplifier.

From the gain block amplifier 42, the return signals pass to the equalizer 68. The equalizer 68 comprises an inductor 82, and a capacitor 90 and a further capacitor 92.

There are three plug in terminals 94, 94, 94. The outer two terminals are connected via connections 96, 98, through capacitor 92 and then to ground through inductor 100 and capacitor 102.

The central terminal 94 is connected directly through to inductor 100 and capacitor 102.

There are a plurality of attenuator modules 104A, B, C, etc., each having three plug in pins, which are adapted to be received in the three plug in sockets 94. The attenuator modules each have different values, providing different levels of equalization. By selecting the appropriate attenuation module, the desired equalizer characteristics can be preset for the particular location in the cable system 10.

From the equalizer 68, the signal goes to the pick up circuit 72. The pick up circuit 72 comprises a three-way arrangement of resistors 106, 108 and 110, with resistor 110 being connected between resistors 106 and 108, and being connected to ground.

In parallel with resistors 106 and 108, there are provided a pair of inductors 112 and 114 each connected to respective capacitors 116 and 118. A third capacitor 120 is connected in parallel with the two inductor capacitor circuits.

From the pick up 72, the signals pass to a plug in attenuator circuit 76. This circuit simply consists of three plug receiving sockets 122, the centre socket being connected to ground.

FIG. 3 has been divided into four sections "1", "2", "3" and "4" and the following is a brief but concise description of the purpose and operation of each section.

Section "1"

The principal purpose of this section is to provide a flat linear gain across the band of interest in the frequency spectrum 5 to 42 Megahertz. Gain is accomplished through the use of a push-pull amplifier hybrid consisting of two single-ended transistor circuits working together so that one single-ended circuit amplifies only during the negative part of the cycle. Although this configuration requires two transistor circuits instead of one for every amplifier stage, it does reduce harmonic distortion significantly and thus can simultaneously amplify, with acceptable distortion, a larger number of signals than can one single-ended stage transistor working alone. The push-pull stages are then re-combined into a single output signal. The scheme of running push-pull circuits in parallel allows each stage to operate at a lower level and thus to produce less distortion for a given input and gain than one push-pull stage.

The +24VDC port derives voltage from a power supply external to the return amplifier but is part of the complete trunk or line extender station. Additional DC voltage filtering is accomplished by employing four additional components L1, C1, C2 and C3.

The hybrid is driven by analog or digital signals at the input port of the return amplifier and usually comes from local sources or further in the cable television system.

The test point port provides for the testing of input levels to the return amplifier. This test port is well isolated from input, through the use of the RF transformer and R4 so that accurate input signal level readings can be made while not interfering with the main signal during the reverse amplifier operation.

Section "2"

The principal purpose of this section is to provide for a means of equalising and balancing the slope of the amplified signals from the amplifier to compensate for cable attenuation characteristics.

Cable characteristics can be calculated by the simple formula of . . .

The difference in loss encountered by two frequencies is;

$$\text{Loss at higher frequencies} \cong \sqrt{\frac{f1}{f2}} \times \text{attenuation}$$

Where
f1 Higher frequency
f2 Lower frequency
attenuation=loss at lower frequencies.

Example.

$$\text{Loss at 42 MHz} \cong \sqrt{\frac{42}{5}} \times \text{loss at 5 MHz}$$

Through the use of common inductive and capacitive circuits represented by L2 and C4 and C5 and L3 and C6 and a plurality of attenuators known as PADS the output of the return amplifier can be adjusted to emulate the cable characteristics. Three round pin sockets are provided on the printed circuit board to allow for the easy change of the PAD devices by either field technicians or bench technicians. PAD devices are available in one-half decibel steps to provide for greater versatility when very accurate system adjustments are demanded by the system design engineers. The drawing only shows one-decibel steps eg. JXP-1, JXP-2 etc. for the purpose of simplicity.

Section "3"

The main purpose of these circuits is to provide shaping of the frequency response at both 5 Megahertz and 42 Megahertz through the use of a pick up circuit. The need to provide a pick up at 5 Megahertz is make to up for the roll-off in the frequency response inherent in the design and manufacture of the hybrid amplifiers produced primarily by the Motorola and Phillips corporations. The need to provide a pick up circuit at 42 Megahertz is to make up for the roll-off in the frequency response that is inherent in the design and manufacture of the diplex filter designs.

Section "4"

The main purpose of circuit is to provide a means of accepting plug in PADS to attenuate the output level or signal. This circuit is designed to adjust the amplifiers flat loss across the frequency band of interest 5 to 42 Megahertz. Three round pin sockets are provided on the printed circuit board to allow for the easy change out of the PAD devices by either field technicians or bench technicians. PAD devices are available in one-half decibel steps to provide for greater versatility when very accurate system adjustments are demanded by the system design engineers. Note that the drawing only shows one-decibel steps eg. JXP-1, JXP-2 etc. for the purpose of simplicity.

A plurality of plug in attenuator modules 124A, 124B etc. provided with suitable plug in pins are adapted to be plugged in to the sockets 122. In this way the performance characteristics of the entire return amplifier 40 can be set to the desired performance for the particular location in the cable network.

In accordance with a further embodiment of the invention, the invention also provides an equalizer for use in the forward amplifiers, for the purpose of replacing the existing equalizers in the existing forward amplifiers on the cable network.

As explained above, the objective of providing the improved equalizers in accordance with the invention, is for the purpose of equalizing the complete bundle of forward signals on the cable network, consisting both of the television signals and also the signals in the Internet band in the signal band width, which typically extend, together from about 50 to 860 Megahertz.

Conventional forward amplifiers are already in place on existing cable networks for amplifying and equalizing television signals. The purpose of this embodiment of the invention is to optimize the signal equalization circuits in the forward amplifiers already on the cable network, so that the forward amplifiers as modified will then amplify all of the signals satisfactorily in the forward signal wave band, and equalize them to the same signal strength.

Figure 4:
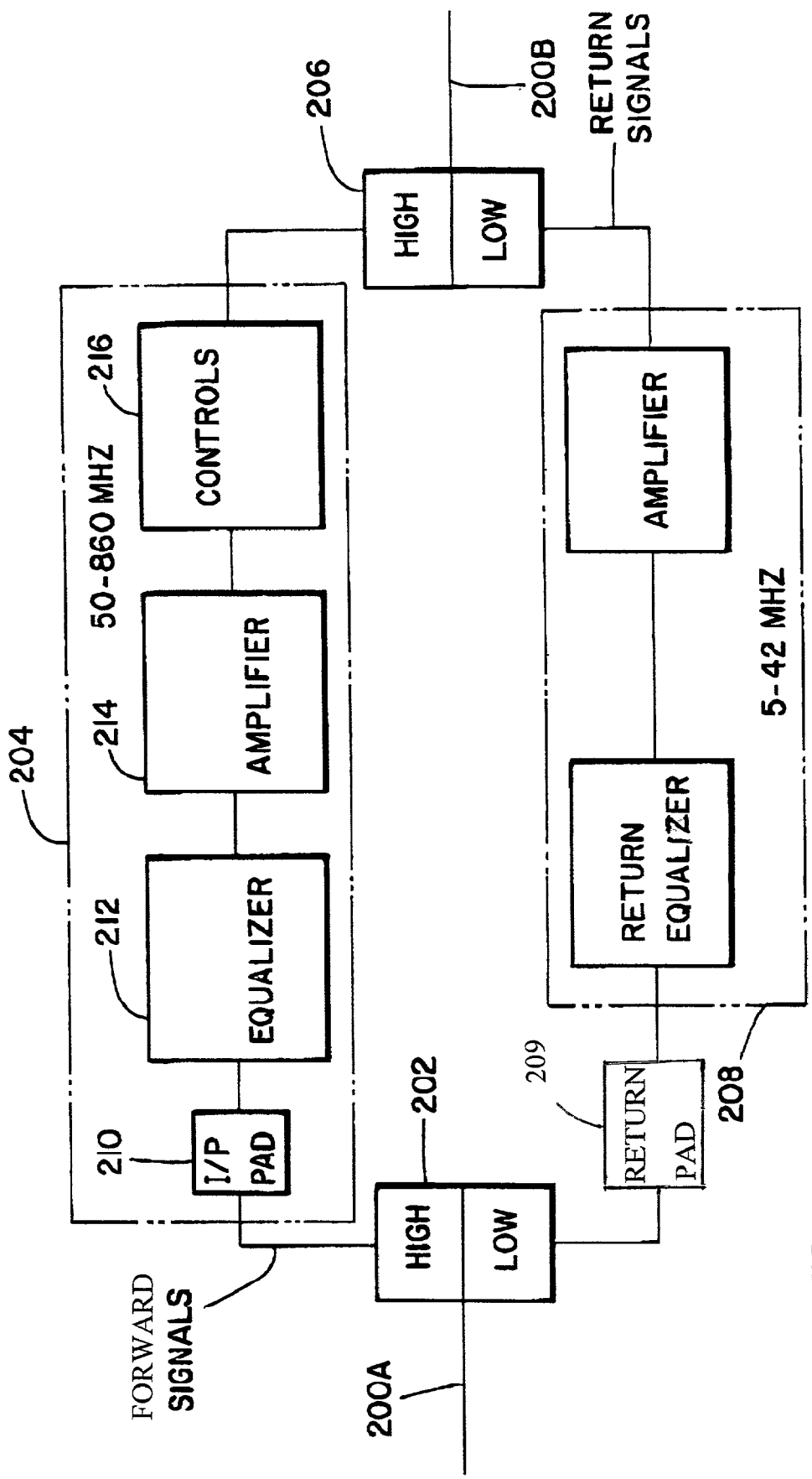
FIG. 4 is a schematic block diagram of a typical forward amplifier, and forward equalizer, as installed in an existing cable network, and showing the return amplifier in accordance with the invention in position.
Figure 5:
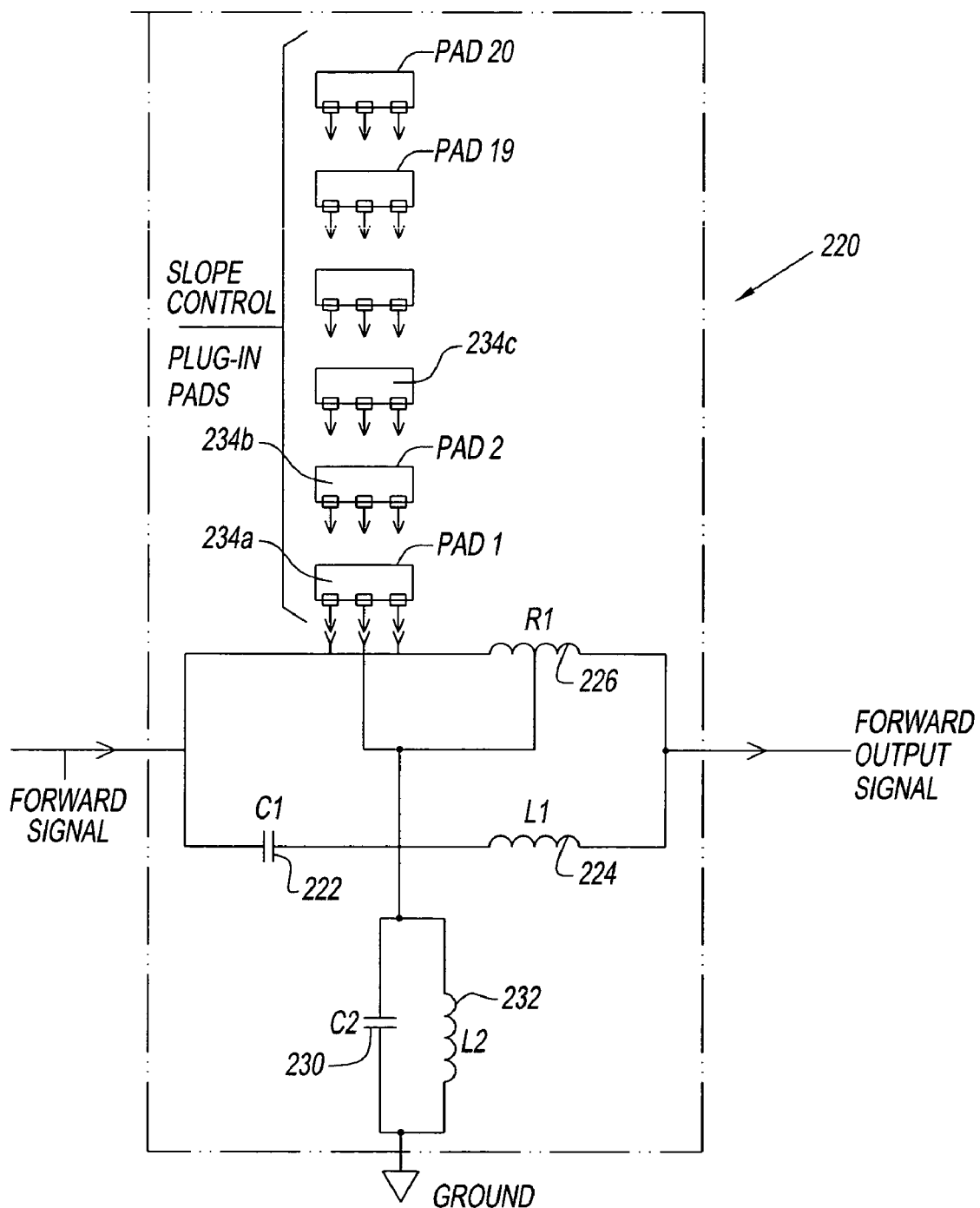
FIG. 5 is a schematic block diagram showing the forward equalizer in accordance with the invention, shown coupled to the existing forward amplifier, replacing the pre-existing forward equalizer; and, FIG. 6 is a schematic block diagram showing a complete installation as it would appear in a cable system.
Figure 6:
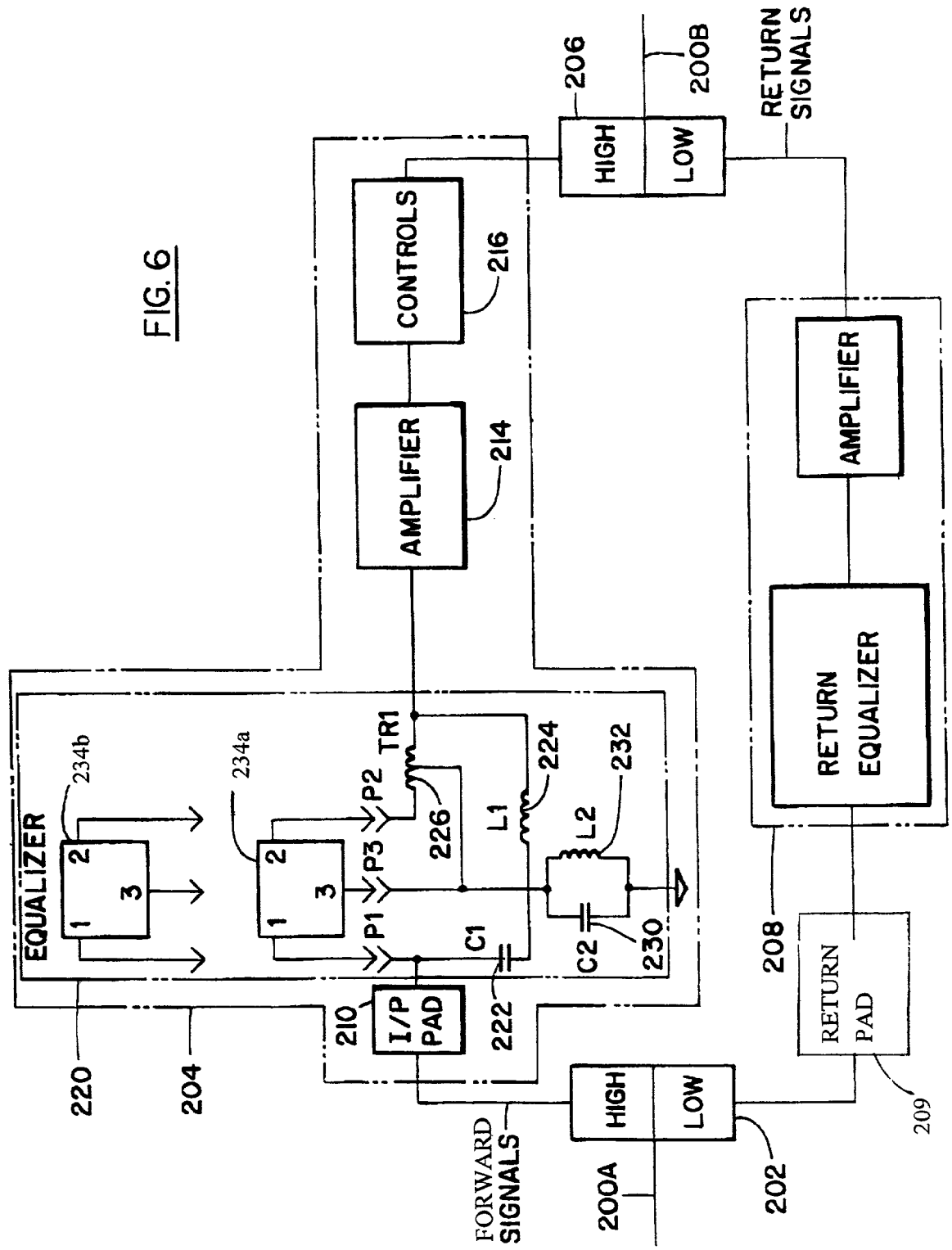

For this purpose, this embodiment of the invention is illustrated in more detail in FIGS. 4, 5 and 6. It will be seen to comprise a portion of a cable transmission network, comprising a typical transmission cable, having an upstream or head end indicated generally as 200A and a downstream end indicated generally as 200B. The head end 200 A is connected, typically through a diplex filter 202, which are well known in the cable transmission art. The diplex filter ensures that all forward signals, both Internet and television and other forward signals, are fed through the forward amplifier assembly indicated generally as 204, and are transmitted to a downstream diplex filter 206 where they are again fed onto the cable 200B.

Filter 206 also controls the return Internet signals and other return signals in the lower frequency range, ie. 5 to 42 Megahertz, and ensures that they are fed back through the return amplifier assembly 208, and are then reintroduced into the cable returning to the upstream or head end of the system through the cable.

The return amplifier 208 functions in the manner already described above, and requires no further description. A return PAD 209 connects return amplifier 208 to filter 202, to reintroduce the return signals to the cable 200A.

However, the forward amplifier assembly indicated generally as 204, comprises an input PAD circuit 210, a forward signal equalizer 212, a forward signal amplifier 214, and optional controls 216. It will be appreciated that the construction of typical forward signal amplifier is somewhat different from the arrangement of the return signal amplifier already described, in that the arrangement of the equalizer and the amplifier is essentially reversed. However, this is the usual way in which existing forward amplifiers already in use are constructed, and accordingly this is used in this illustration for the purposes of simplicity. In any event, as explained above, the purpose of this embodiment of the invention is to provide a means of optimizing the equalization of the already existing forward amplifiers and not to completely replace them.

As already explained above, in this embodiment of the invention, the forward amplifier assembly 204 is modified by removing the existing signal equalizer circuit 212, (of FIG. 4), present in the existing standard forward assembly amplifier assembly 204, by a new forward signal equalizer circuit 220, shown in more detail in FIGS. 5 and 6.

As shown in FIG. 5, the replacement forward equalizer circuit 220 comprises a capacitor 222, and first inductance 224 and a transformer 226. A selected plug-in PAD circuit 234a, b, c and so on, has first, second and third plug in connections P1, P2, and P3. Connection P1 is connected to the capacitor 222 and to the inductor 224.

Connection 2 is connected directly to the transformer 226.

Connection 3 of the selected PAD circuit 234 is connected to ground through a capacitor 230 and inductor 232.

In order to vary the equalization characteristics of the equalizer 220, a series of different plug-in attenuator components indicated generally as 234a, 234 b, and so on (FIG. 5) are provided. There may be as many as twenty or more such components, having characteristics varying from one to another. A selected one of such components may be connected in place by the simple plug-in pin connections of a type well known and described above.

Thus in order to modify the forward amplifier on the existing cable transmission line, all that is required is for the lines person to remove the existing equalizer, in the existing forward amplifier and to replace it with an equalizer as shown in FIG. 5. The lines person then measures the signal strength at that point, and selects the most appropriate plug-in attenuator component 234, to produce a flat signal across the frequency band. FIG. 6 shows the complete installation for the sake of clarity.

The equalizer circuit and the attenuator components are relatively light and small and do not occupy a great deal of space, and do not represent a great deal of mass or weight.

Consequently, it is easy for the lines person to carry at least one equalizer and a supply of attenuator components up the pole, and to deal with the amplifier when he finds it, without having to climb up and down to the amplifier several times.

It will thus be seen that by use of the teaching of the invention, it is possible for a complete cable distribution network 10 to be modified and optimized to carry both signals used on the Internet system and the television signals and other signals which pass through the forward amplifiers 204 having modified equalizer circuits, on their way to the subscribers. The return signals in the lower wave band pass through the return amplifiers 208. In this way, the Internet server and other receivers when receiving return signals from the customers or subscribers will receive signals at an appropriately amplified level, with the signal strengths across the entire frequency range being equalized, so as to ensure satisfactory transfer of all information.

It will be apparent from the foregoing that the invention provides a novel equalizer, which can be used and physically designed to be installed in a wide variety of different amplifier models.

Where it is used for forward signals then it may be necessary to carry up to twenty plug in components 234, each having varying values, to accommodate the greater bandwidth of the forward signals.

The number twenty is not regarded as limiting however. Whatever number are required may be carried for a particular application.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A forward amplifier signal equalization circuit for use with a forward amplifier for two-way coaxial cable systems having a distribution center distributing a plurality of forward signals, a plurality of coaxial cable lines extending therefrom, a plurality of tap ports connecting the plurality of forward signals from each coaxial cable line of the plurality of coaxial cable lines to respective terminals, and the two-way coaxial cable system having reception facilities for receiving a plurality of return signals from the two-way coaxial cable system, wherein the plurality of forward signals and the plurality of return signals passing along the two-way coaxial cable system in opposite directions are progressively attenuated in signal strength, the two-way coaxial cable system having a plurality of forward amplifiers at spaced intervals therealong, for receiving the plurality of forward signals passing along the plurality of coaxial cable lines, and amplifying the same, the equalization circuit comprising:

a signal equalization circuit connectable in each forward amplifier of the plurality of forward amplifiers, said signal equalization circuit for equalizing the signal strengths of signals across a wave band of the plurality of forward signals and having a plurality of receptacles for receiving a plurality of plug in circuit components for varying the characteristics of the equalization circuit; and, a plurality of plug in attenuator components for said signal equalization circuit, said plurality of plug in attenuator components being adapted to interfit with said signal equalization circuit interchangeably, said plurality of plug in attenuator components having a range of varying performance characteristics, wherein each of said plurality of plug in attenuator components can be selected and plugged into said signal equalization circuit to produce performance specifications desired for each forward amplifier of the plurality of forward amplifiers at a predetermined location along the two-way coaxial cable system.

2. A forward amplifier signal equalization circuit for use with the forward amplifier for two-way coaxial cable systems as claimed in claim 1, further comprising a return amplifier, said return amplifier adapted to be connected to the two-way coaxial cable system around the forward amplifier, wherein the plurality of forward signals can pass through the forward amplifier in a forward direction, and the plurality of return signals pass through said return amplifier around the forward amplifier in a return direction.

3. A forward amplifier signal equalization circuit for use with the forward amplifier for two-way coaxial cable systems as claimed in claim 2, wherein said return amplifier has a return signal equalizer circuit, said return signal equalizer circuit being adapted to receive one of said plurality of plug in attenuator components having predetermined characteristics, and wherein said characteristics of said return amplifier can be adjusted, by interchanging said plurality of plug in attenuator components in said return signal equalizer circuit.

4. A forward amplifier signal equalization circuit for use with the forward amplifier for two-way coaxial cable systems as claimed in claim 3, wherein said return signal equalizer circuit incorporates a plurality of PAD circuit receptacles, each of said plurality of PAD circuit receptacles being adapted to receive one of a said plurality of plug in attenuator components, wherein each of said plurality of plug in attenuator components for said forward signal equalizer circuit, and for a return amplifier circuit, are all of identical design, and are interchangeable between said forward signal equalizer circuit and said return amplifier circuit.

5. A forward amplifier signal equalization circuit for use with the forward amplifier for two-way coaxial cable systems as claimed in claim 4, wherein said forward signal equalization circuit has one PAD circuit receptacle from said plurality of PAD circuit receptacles, said one PAD circuit receptacle having a first connection, a second connection, and a third connection, said first connection being connected to receive the plurality of forward signals a capacitor and an inductance, said second connection being connected to a transformer resistor, said third connection being connected to ground through a capacitor and an inductance, and substantially a midpoint of a transformer.

6. A method of setting the characteristics of a signal equalizer for a coaxial cable system of the type having a distribution center distributing forward signals, a plurality of coaxial cable lines extending therefrom, and a plurality of tap ports connecting signals from the coaxial cable line to respective terminals, wherein forward signals passing along said coaxial cable system are progressively attenuated in signal strength, said coaxial cable system having signal amplifiers at spaced intervals there along for receiving said forward signals passing along said coaxial cables and for amplifying the same, said coaxial cable system having equalizers at respective amplifiers for equalizing the strengths of said signals across their signal wave band width, said equalizers having receptacles for receiving plug in circuit components having varying characteristics, for producing varying levels of signal strength equalization, the method comprising the steps of:
  measuring the strength of said forward signals passing through said signal amplifier and said equalizer;
  selecting a plug in attenuator component having the characteristics desired for the signal strength measured at that location;
  plugging said selected attenuator components into the respective equalizer to produce the performance specifications specific for said forward signals desired at a predetermined location along said a coaxial cable system.

7. A method as claimed in claim 6, further comprising the steps of measuring said signal strength across a band width of said forward signals to determine the attenuation of said forward signals at various frequencies in said band width.

8. A method as claimed in claim 7, further comprising the step of passing said forward signals through a PAD circuit adapted to receive one of a plurality of plug in attenuator components, wherein the plug in attenuator components for the equalizer circuit and for the PAD circuit, are all of identical design, and are interchangeable between the equalizer circuit and the PAD circuit.

9. A method as claimed in claim 8, further comprising the step of passing return signals through a return amplifier around said forward amplifier in a return direction.

* * * * *